2 Sheets—Sheet 1.

K. H. C. PRESTON.
Harvester-Rake.

No. 212,153. Patented Feb. 11, 1879.

WITNESSES
W. C. Corliss
Jno C MacGregor

INVENTOR
King H C Preston
By Coburn & Thacher
Attorneys

2 Sheets—Sheet 2.

K. H. C. PRESTON.
Harvester-Rake.

No. 212,153. Patented Feb. 11, 1879.

WITNESSES
W. C. Corlies
Jno. C. MacGregor

INVENTOR
King H. C. Preston,
By Coburn & Thacher
Attorneys

UNITED STATES PATENT OFFICE.

KING H. C. PRESTON, OF MANLIUS, NEW YORK.

IMPROVEMENT IN HARVESTER-RAKES.

Specification forming part of Letters Patent No. 212,153, dated February 11, 1879; application filed April 12, 1878.

*To all whom it may concern:*

Be it known that I, KING H. C. PRESTON, of Manlius, in the county of Onondaga and State of New York, have invented a new and useful Improvement in Harvester-Rakes, which is fully described in the following specification, reference being had to the accompanying drawings, in which—

Figure 1:
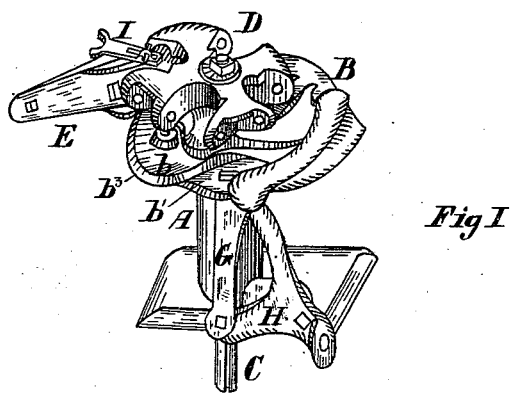
Figure 2:
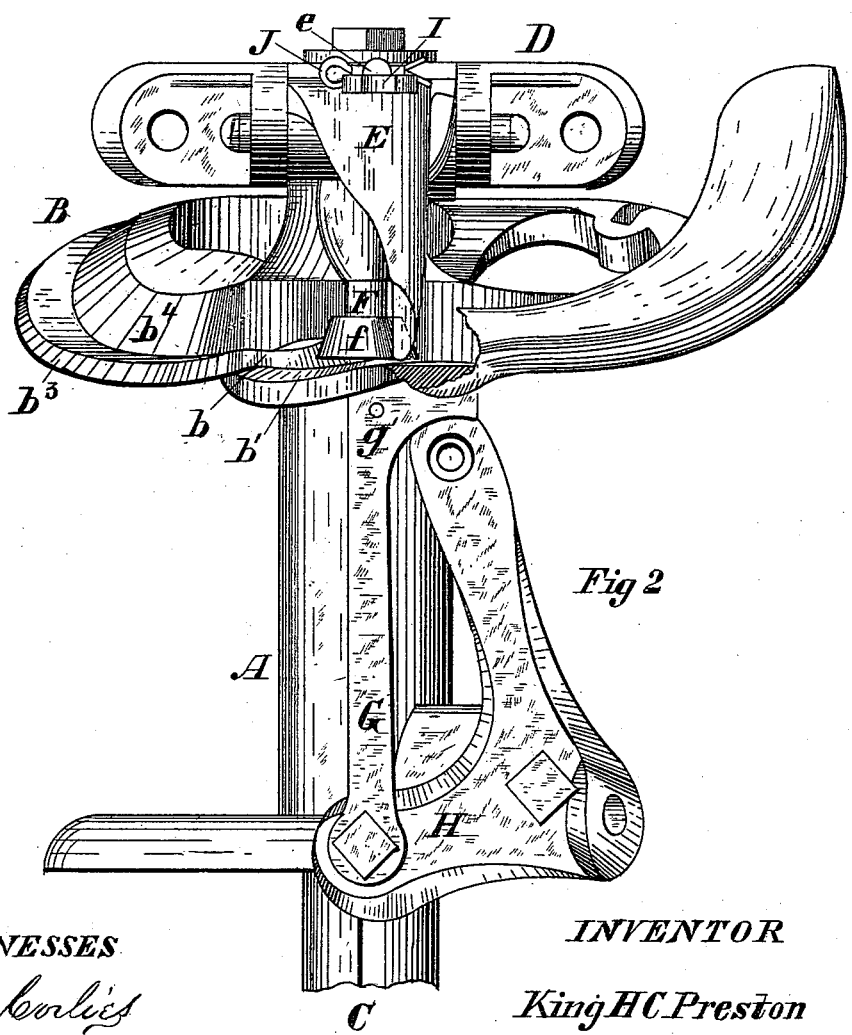
Figure 3:
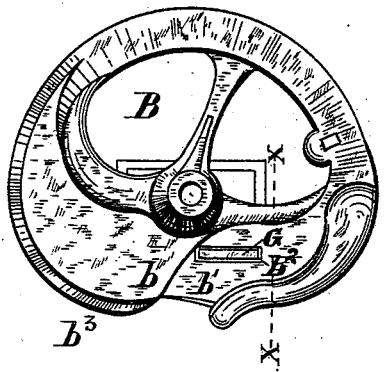
Figure 4:
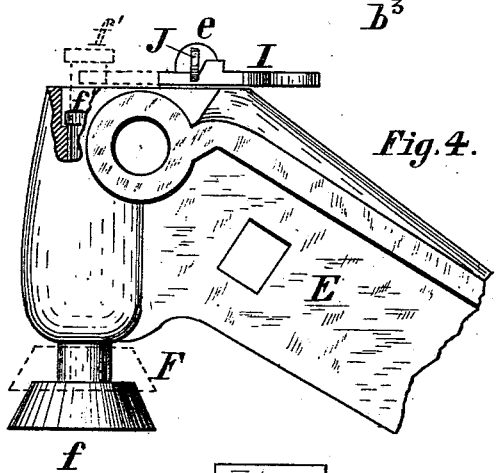
Figure 5:
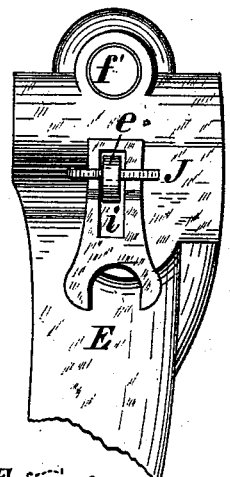
Figure 8:
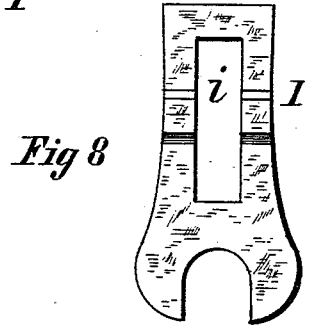
Figure 6:
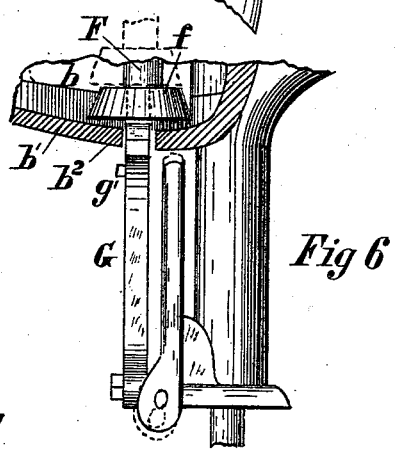
Figure 7:
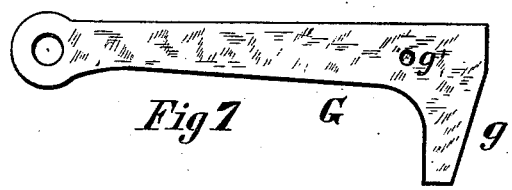

Figure 1 represents a perspective view of a rake embodying my improvements; Fig. 2, a front elevation of the same on an enlarged scale; Fig. 3, a plan view of the cam-guide for the rakes; Fig. 4, an elevation, on an enlarged scale, of the inner end of one of the rake-arms; Fig. 5, a plan view of the same; Fig. 6, a sectional view taken on the line $x\,x$, Fig. 3; Fig. 7, a detached view of the upright sliding cam or track-changer, and Fig. 8 a similar view of a loop or catch for holding up the sliding shaft of the friction-rollers.

My invention relates to that class of harvester-rakes generally known as "combined revolving rake and reel," in which a series of rake-arms are attached to a revolving head, and are controlled by a double-tracked cam and switches, so as to operate either simply as reels, or as both reels and rakes, as may be desired.

The object of my invention is to simplify the mechanism by means of which the path of the rake is changed, so as to operate as a reel or a rake.

The invention consists in mounting the shaft of the friction-wheel at the inner end of the rake-arm loosely in its bearing, so that it is free to slide up and down therein.

It also consists in a sliding cam or track-changer, by means of which the friction-wheel is carried onto the upper track when it is desired to have a rake sweep the platform.

It also consists in the special devices for operating the sliding cam or track-changer.

It also consists in a device for holding up the friction-wheel permanently when it is desired to have one of the rakes sweep the platform at every revolution.

It also consists in various combinations of devices, all of which will be hereinafter more fully set forth.

The general features of the harvester rake and reel to which my invention pertains are well known, and will only be alluded to in a general way in this description.

In the drawings, A represents the ordinary standard, which is secured to the platform or finger-beam as usual, and carries upon its upper end the cam B. A shaft, C, is mounted in the standard, and is provided at its upper end with the head D, to which the rake-arms are hinged, in the usual manner, by means of the elbow-piece E, to which they are attached.

In rakes of this kind, a friction-wheel which travels upon the cam is usually mounted on a fixed bearing at the inner end of the elbow-coupling. I mount a shaft, F, loosely in the inner end of the elbow by extending it up through the elbow, as shown in Fig. 4 of the drawings. This shaft is a little longer than its bearing, and upon its lower end is fastened the friction-wheel $f$, and at its upper end is a flange, $f'$, thereby providing a head which prevents it from slipping out of its bearing. The hole in which the shaft is inserted is enlarged slightly at the upper end, so as to countersink the head of the shaft, which rests upon a seat below the surface, as shown in Fig. 4 of the drawings. This roller-shaft is free to slide back and forth in its bearings, carrying the friction-roller up and down with it.

The cam B is, in most respects, like those in general use with rakes of this description; but at that portion thereof where two tracks are provided it differs from most of those now in use. Instead of arranging these tracks side by side, one of them—the inner one—is arranged upon a higher plane than the other. This is accomplished by making a portion, $b$, of the cam higher than the portion $b^1$ immediately in front thereof, the rise being sharp, so as to make a perpendicular face between the two, as shown in Figs. 1 and 2 of the drawings. This face has an easy bend outward, as shown in Fig. 3 of the drawings, so that the friction-roller on the rake-arm will readily follow it.

A slot, $b^2$, is cut down through the lower track, $b^1$, just in front of the perpendicular ledge between it and the upper track, as shown in Fig. 3 of the drawings, and a cam, G, is arranged to slide up and down therein. The upper end of this cam fits the slot, and has an incline, $g$, upon its upper edge or face, as shown in Fig. 7 of the drawings, the cam being arranged so that the incline slopes away from the perpendicular ledge. The lower end of this cam-piece is hinged to one arm of an angular lever, H, which is pivoted to the standard, as shown in Fig. 2 of the drawings, and arranged so that when the lever is vibrated the cam G will be forced up through the slot in the rake-cam. A stop, $g'$, is provided on one side of the sliding cam G, which prevents the latter from being carried up too far. When not held up by the lever, the sliding cam falls down within the slot by its own weight.

Now, when the friction-roller shaft is left free to slide up and down, as described above, and the rake is revolved, the roller will, of course, slip down and follow the lowest path unless interfered with. When, in the revolution of the rake-head, the arm is brought round, so that the roller is traveling along the lower portion, $b^1$, of the cam, and the switch-cam G is down within its slot, the edge of the roller will follow along the perpendicular ledge between the upper and lower portions, $b\ b^1$, of the cam, as shown in full lines in Fig. 6 of the drawings, and will pass out upon the outer track or portion of the cam, $b^3$, thereby throwing up the rake-arm, so that it will pass over the grain on the platform.

When it is desired to have a rake sweep the platform to discharge the grain therefrom, the sliding cam G is thrown up by means of the lever H just before the friction-roller reaches that portion of the track. The roller is then, by the sliding of its shaft, carried up the incline $g$ to the upper portion of the cam $b$, as shown in dotted lines in Fig. 6 of the drawings, where it will rest upon and follow the inner guide-ledge, $b^4$, which is inside of and above the outer ledge, $b^3$. The rake will now sweep the platform and discharge the gavel, and, the lever being released, the switch-cam will drop into its slot, and the next arm will be thrown up, as above described.

The sliding cam G, it will be seen, thus becomes a track-changer through the medium of the sliding shaft which carries the friction-roller, and all spring-switches and other like devices are dispensed with.

A cord attached to the lever H extends to the driver, so that he can raise the switch-cam at pleasure, and cause any one of the rakes to sweep the platform.

In some instances it may be desirable to fix one of the rakes so that it will sweep the platform at each revolution without attention on the part of the driver. To accomplish this I provide a keeper, I. (Shown in Fig. 8 of the drawings.) This is forked at one end, and is provided with a long central slot, $i$. A stud, $e$, is provided on the top of the elbow-piece, which is adapted to enter the slot $i$.

When it is desired to have one of the rakes sweep the platform at every revolution, this keeper is placed upon the stud with the forked end inward, and the friction-roller shaft is raised up so that it will be embraced by the fork of the keeper below its head, as shown in dotted lines in Fig. 4 of the drawings, when it is evident that the roller will always follow the upper and inner track of the cam, and the rake to which it is attached will sweep the platform every time. The keeper is held in place by means of a pin, J, passing through the stud and lugs $i$ on the upper face of the keeper.

When not desired for use, as above described, the keeper is turned with its forked arm outward, as shown in Fig. 5 and in full lines in Fig. 4 of the drawings, in which position it does not interfere with the roller and shaft.

This device for changing the path of the rakes is very cheap and simple, and certain in its operation. There is nothing which can become disarranged so as to prevent the operation of the track-changer, and there is no danger of stopping the rake or breaking any of the parts by moving the switch at the wrong time.

Having thus described my invention, what I claim as new, and desire to secure by Letters Patent, is—

1. The rake-cam B, constructed with a section, $b$, of the track raised above the section $b^1$, an outer ledge or track, $b^3$, and a ledge or track, $b^4$, inside of and raised above the former, substantially as described.

2. The rake-elbow E, provided with a friction-wheel, $f$, mounted loosely thereon, so as to be free to move up and down, substantially as and for the purpose set forth.

3. The shaft F, mounted loosely in a bearing in the rake-elbow, within which it freely slides, and provided with a friction-wheel, $f$, at its lower end, substantially as described.

4. The inclined cam or track-changer G, sliding vertically, in combination with the rake-cam B, constructed with the upper and lower tracks, $b\ b^1$, substantially as described.

5. The rake-elbow E, in combination with a sliding friction-roller shaft, F, cam B, having the upper and lower tracks, $b\ b^1$, and movable inclined cam G, substantially as described.

6. The rake-cam B, constructed as described, and provided with a slot, $b^2$, in combination with the movable inclined cam G and lever H, substantially as described.

7. The sliding roller-shaft F, mounted in the rake-elbow E, in combination with the forked and slotted keeper I, substantially as described.

KING H. C. PRESTON.

Witnesses:
JAS. MARTIN,
W. M. PRESTON.